(12) United States Patent
Wada et al.

(10) Patent No.: US 6,982,837 B2
(45) Date of Patent: Jan. 3, 2006

(54) OBJECTIVE LENS DRIVER

(75) Inventors: Takuya Wada, Yawata (JP); Shin Ishibashi, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/512,125

(22) PCT Filed: May 16, 2003

(86) PCT No.: PCT/JP03/06095

§ 371 (c)(1),
(2), (4) Date: Oct. 20, 2004

(87) PCT Pub. No.: WO03/098614

PCT Pub. Date: Nov. 27, 2003

(65) Prior Publication Data

US 2005/0225875 A1    Oct. 13, 2005

(30) Foreign Application Priority Data

May 17, 2002   (JP)   ............................. 2002-142638

(51) Int. Cl.
*G02B 15/14*    (2006.01)

(52) U.S. Cl. ..................... 359/694; 359/819; 359/822
(58) Field of Classification Search ................ 359/694, 359/696, 698, 811, 813, 819, 822, 823, 824
See application file for complete search history.

(56) References Cited

FOREIGN PATENT DOCUMENTS

| JP | 4-325932 | 11/1992 |
|---|---|---|
| JP | 10-302282 | 11/1998 |
| JP | 2000-132852 | 5/2000 |

*Primary Examiner*—Timothy Thompson
(74) *Attorney, Agent, or Firm*—Hamre, Schumann, Mueller & Larson, P.C.

(57) ABSTRACT

An objective lens driver comprises an objective lens, a lens holder, a plurality of support members for supporting the lens holder in such a manner as to enable the objective lens to move along the focusing direction and along the tracking direction, a drive means for driving the lens holder, a fixing member provided with a viscoelastic member formed to hold each support member, each support member including a linear section linearly formed to connect to viscoelastic member provided in the fixing member and to the lens holder, and at least one arm branching from somewhere between the ends of each linear section so as to reduce resonance of each support member generated when the lens holder is driven by the drive means.

8 Claims, 9 Drawing Sheets

OBJECTIVE LENS DRIVER

TECHNICAL FIELD

The present invention relates to an objective lens driving device that is provided in an apparatus for optically recording information on or reproducing information from a recording medium.

BACKGROUND ART

In order to correct defocusing caused by the vertical motion due to warping of a disk-like recording medium (in the following, referred to as a disk) and tracking deviation caused by decentering of the disk, an objective lens driving device drives an objective lens in two axial directions, namely, an optical axis direction perpendicular to the surface of the recording medium (a focusing direction) and a radial direction parallel with the recording medium surface (a tracking direction), thus optically recording information on or reproducing information from the disk.

Figure 9:
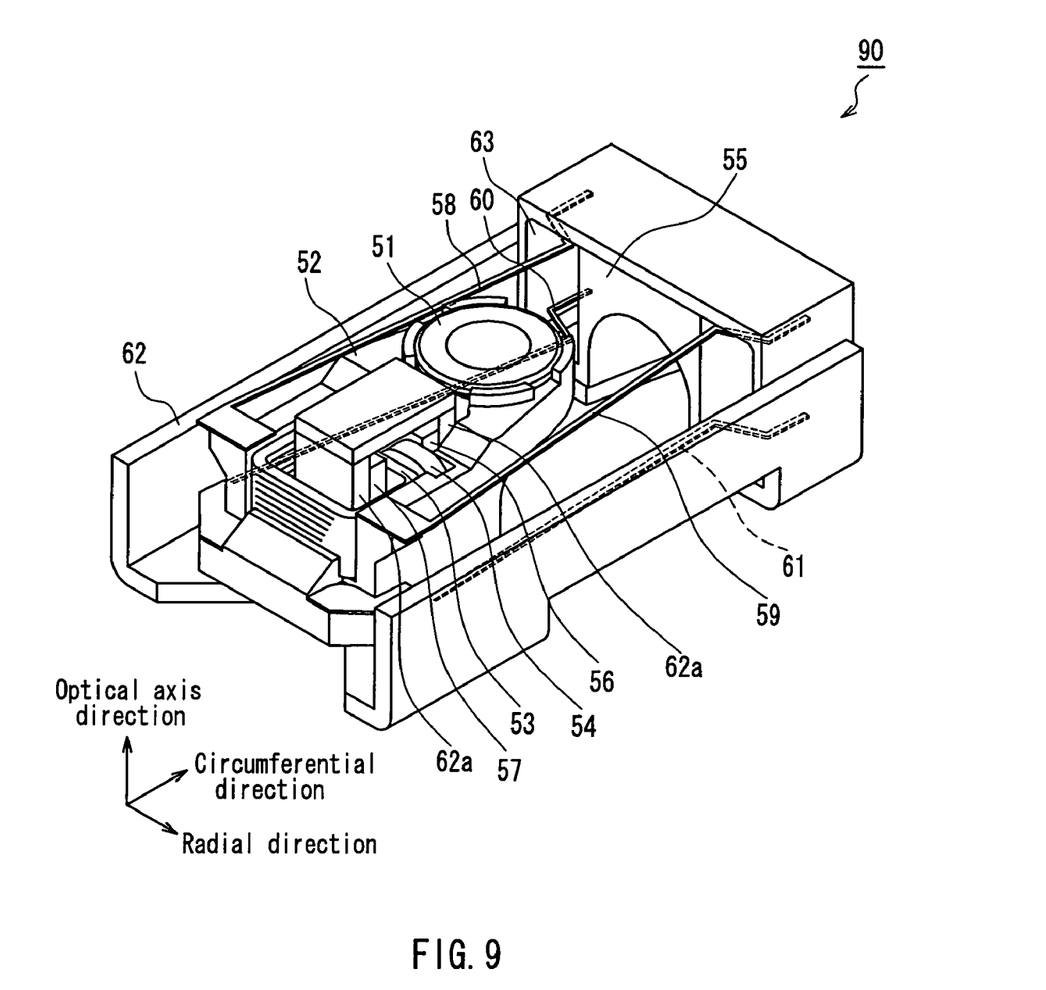
FIG. 9 is a perspective view showing a configuration of a conventional objective lens driving device.

In the following, an example of a conventional objective lens driving device mentioned above will be described, with reference to the accompanying drawings. FIG. 9 is a perspective view showing a configuration of a conventional objective lens driving device 90. The objective lens driving device 90 includes a lens holder 52, to which an objective lens 51, a focusing coil 53 and a tracking coil 54 are fixed. These lens holder 52, the objective lens 51, the focusing coil 53 and the tracking coil 54 constitute a movable portion.

The focusing coil 53 has a winding axis along the optical axis direction of the objective lens 51 shown in FIG. 9. The tracking coil 54 has a winding axis along a circumferential direction, which is a direction perpendicular to the optical axis direction and a radial direction of the disk shown in FIG. 9.

The objective lens driving device 90 is provided with four support members 58, 59, 60 and 61 formed of an elastic material such as phosphor bronze sheet. One end of each of the support members 58, 59, 60 and 61 is joined to the lens holder 52, while the other end thereof is fixed to a fixing member 55.

Since the lens holder 52 is cantilevered by the support members 58, 59, 60 and 61 as described above, it is freely movable within the elastic deformation range of the support members 58, 59, 60 and 61.

Magnets 56 and 57 are fixed to yoke portions 62a provided in a base 62. The magnets 56 and 57 are disposed so that their opposite poles face each other, and the focusing coil 53 and the tracking coil 54 are disposed in a gap between the magnets 56 and 57 and constitute a focusing driving system and a tracking driving system, respectively.

The fixing member 55 holds viscoelastic members 63. The vicinity of each end portion of the support members 58, 59, 60 and 61 on the side of the fixing member 55 is covered with the viscoelastic members 63.

Now, an operation of the objective lens driving device 90 constituted as above will be described. The following description is directed to the operation of the objective lens driving device 90 that drives the objective lens 51 along two axes of the optical axis direction and the radial direction in order to correct the defocusing caused by the vertical motion due to the disk warping and the tracking deviation caused by decentering.

Referring to FIG. 9, the magnets 56 and 57 generate a magnetic flux along the circumferential direction in the gap between these magnets. When an electric current is passed through the focusing coil 53, a force along the optical axis direction acts on the focusing coil 53, which crosses this magnetic flux. The force acting on the focusing coil 53 flexes the support members 58 to 61, thereby translating the movable portion substantially along the optical axis direction.

Similarly, when an electric current is passed through the tracking coil 54, a force along the radial direction acts on the tracking coil 54, which crosses the magnetic flux. The force acting on the tracking coil 54 flexes the support members 58, 59, 60 and 61, thereby translating the movable portion constituted by the lens holder 52, the objective lens 51, the focusing coil 53 and the tracking coil 54 substantially along the radial direction.

In this way, the objective lens driving device 90 has a cantilevered configuration in which the movable portion is fixed to the front end of the support members 58, 59, 60 and 61 formed of the elastic material. Thus, various resonance occurs when the movable portion is driven by the focusing driving system and the tracking driving system.

In order to reduce this resonance, the viscoelastic members 63 are held in the fixing member 55, and the vicinities of end portions of the support members 58, 59, 60 and 61 on the side of the fixing member 55 are brought into contact with these viscoelastic members 63. In this way, the vibrations of the support members 58, 59, 60 and 61 at the time of resonance are transmitted to the viscoelastic members 63, so that the resonance is reduced by a vibration damping function of the viscoelastic members 63.

Figure 10:
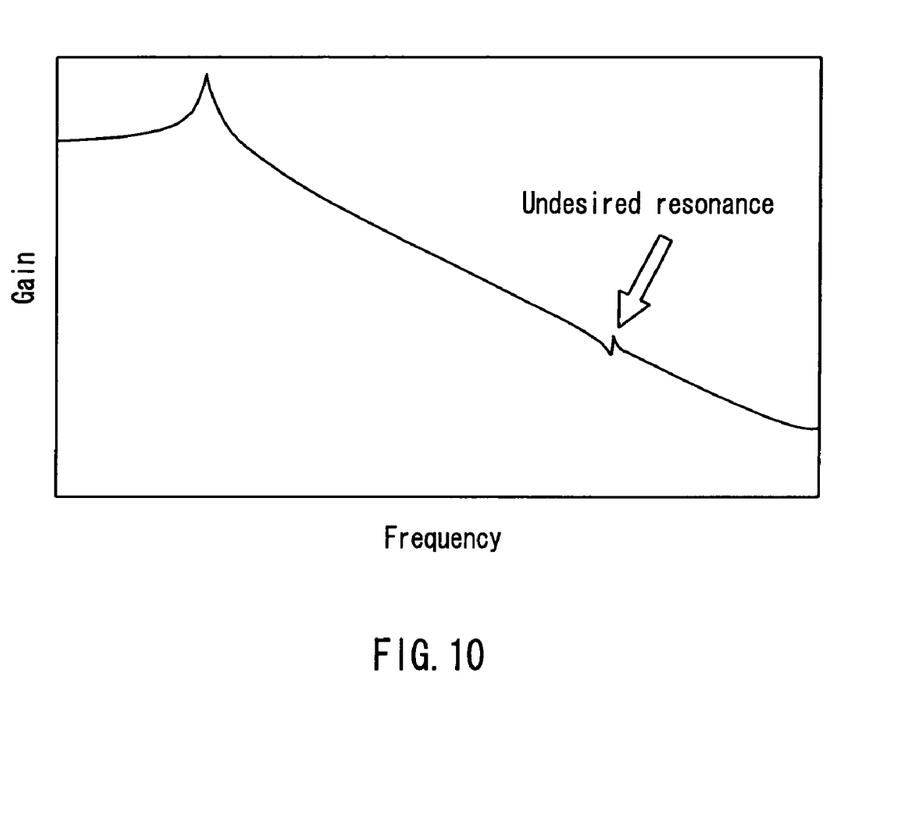
FIG. 10 is a graph showing a relationship between a resonance frequency and a gain of support members provided in the conventional objective lens driving device.

However, with respect to displacement frequency characteristics when the movable portion is driven along the radial direction (tracking direction), undesired resonance occurs in the vicinity of the oscillation frequencies of the movable portion, i.e., 3 to 4 kHz as shown in FIG. 10.

Figure 11:
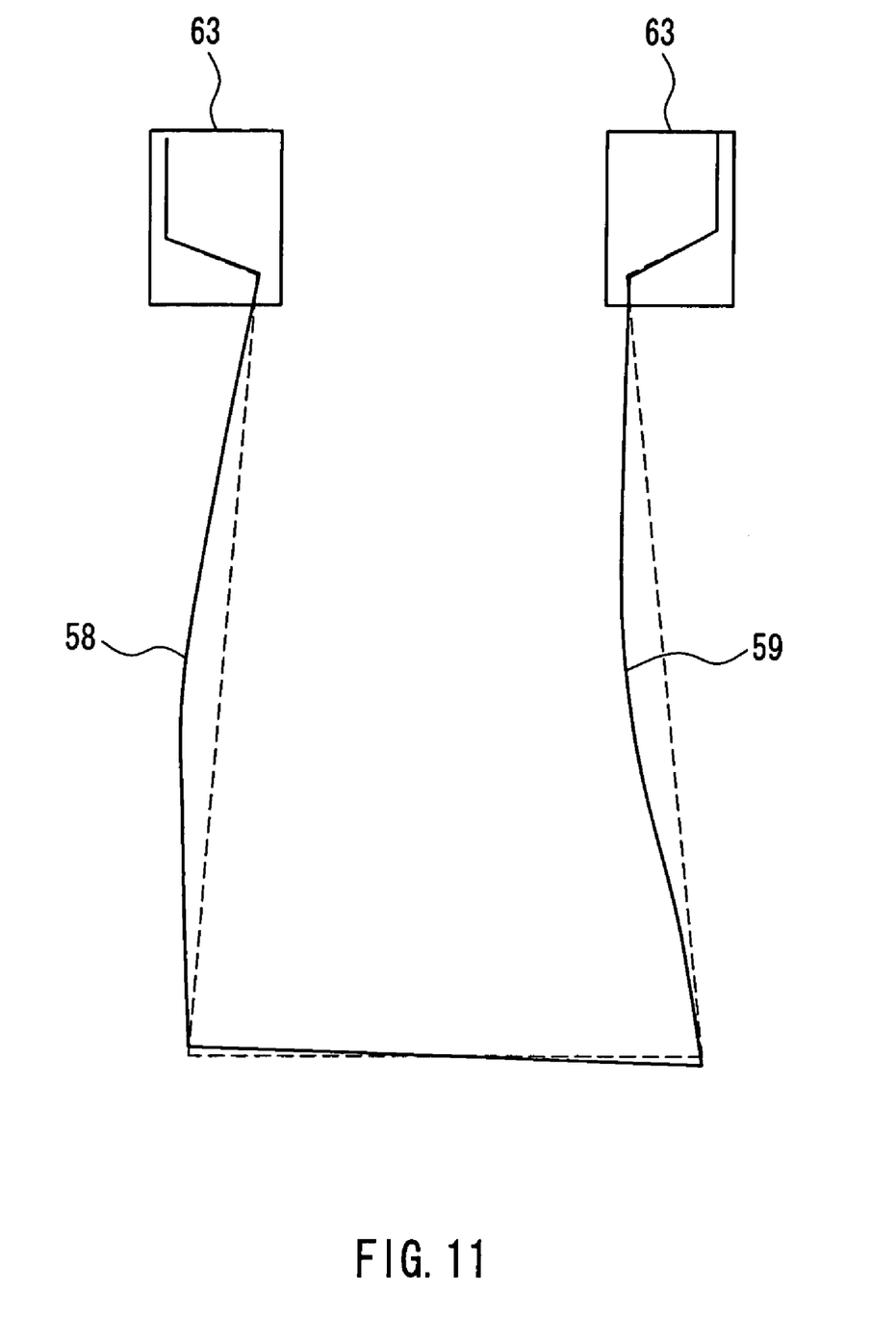
FIG. 11 is a schematic view for describing resonance of the support members provided in the conventional objective lens driving device.

In FIG. 11, a solid line indicates how the support members 58 and 59 are displaced at this time of resonance in an enlarged view. With a miniaturization of objective lens driving devices, it has become more difficult to enlarge portions where the support members contact the viscoelastic members 63. Accordingly, as shown in FIG. 11, the amplitude amount in the portions where the support members contact the viscoelastic members 63 are small when the resonance occurs in the support members, making it difficult to reduce the resonance by the vibration damping function of the viscoelastic members 63. Furthermore, when such undesired resonance occurs, the control for driving the objective lens becomes unstable. This brings about phenomena such as tracking deviation, leading to a problem of signals not being recorded or reproduced stably.

It is an object of the present invention to provide an objective lens driving device that can reduce the resonance of support members, thus driving an objective lens in a stable manner.

DISCLOSURE OF INVENTION

An objective lens driving device according to the present invention includes an objective lens provided for focusing light onto a recording medium so as to optically record information on or reproduce the information from the recording medium, a lens holder for holding the objective lens, a plurality of support members for supporting the lens holder so that the objective lens is freely movable in a focusing direction perpendicular to a surface of the recording medium and a tracking direction perpendicular to the focusing direction, a driving system for driving the lens holder in the focusing direction and the tracking direction, and a fixing member provided with a viscoelastic member formed for holding the plurality of support members. Each of the plurality of support members includes a linear portion formed linearly so as to connect with the viscoelastic member provided in the fixing member and the lens holder, and at least one arm portion branching off from an intermediate area of the linear portion so as to reduce a resonance of each of the plurality of support members occurring when the lens holder is driven by the driving system.

Another objective lens driving device according to the present invention includes an objective lens provided for focusing light onto a recording medium so as to optically record information on or reproduce the information from the recording medium, a lens holder for holding the objective lens, a plurality of support members for supporting the lens holder so that the objective lens is freely movable in a focusing direction perpendicular to a surface of the recording medium and a tracking direction perpendicular to the focusing direction, a driving system for driving the lens holder in the focusing direction and the tracking direction, a fixing member provided for holding the plurality of support members, and a viscoelastic member provided in contact with the plurality of support members so as to reduce a resonance of the plurality of support members occurring when the lens holder is driven by the driving system.

BEST MODE FOR CARRYING OUT THE INVENTION

In an objective lens driving device according to the present embodiment, each of the plurality of support members includes a linear portion formed linearly so as to connect with the viscoelastic member provided in the fixing member and the lens holder, and at least one arm portion branching off from an intermediate area of the linear portion so as to reduce a resonance of each of the plurality of support members occurring when the lens holder is driven by the driving system. Thus, the resonance of the support members occurring when the lens holder is driven by the driving system is reduced by the arm portions. Consequently, with a configuration that is substantially the same as the conventional configuration, it is possible to achieve stability of a focusing driving and a tracking driving.

In this embodiment, it is preferable that the arm portion is formed to connect with the viscoelastic member provided in the fixing member.

It is preferable further to include a base for fixing the fixing member, wherein the arm portion is formed to connect with a base viscoelastic member provided in the base.

It is preferable that the arm portion is formed in a plane perpendicular to the focusing direction.

It is preferable that the arm portion is formed in a plane perpendicular to the tracking direction.

It is preferable that the at least one arm portion includes two arm portions, one of the two arm portions is formed in a plane perpendicular to the focusing direction, and the other is formed in a plane perpendicular to the tracking direction.

It is preferable that the arm portion is formed to branch off from a vicinity of a loop of a natural resonance of the support members.

It is preferable that a distance B between a position at which the arm portion branches off from the linear portion and one end of the linear portion is $1/5$ to $4/5$ of a total length L of the linear portion.

It is preferable that a distance B between a position at which the arm portion branches off from the linear portion and one end of the linear portion is $1/5$ to $1/2$ of a total length L of the linear portion.

In another objective lens driving device according to the present embodiment, a viscoelastic member is provided in contact with the plurality of support members so as to reduce the resonance of the plurality of support members occurring when the lens holder is driven by the driving system. Thus, the resonance of the support members occurring when the lens holder is driven by the driving system is reduced by the viscoelastic member. Consequently, with a configuration that is substantially the same as the conventional configuration, it is possible to achieve the stability of a focusing driving and a tracking driving.

The following is a description of the embodiment of the present invention, with reference to the accompanying drawings.

Figure 1:
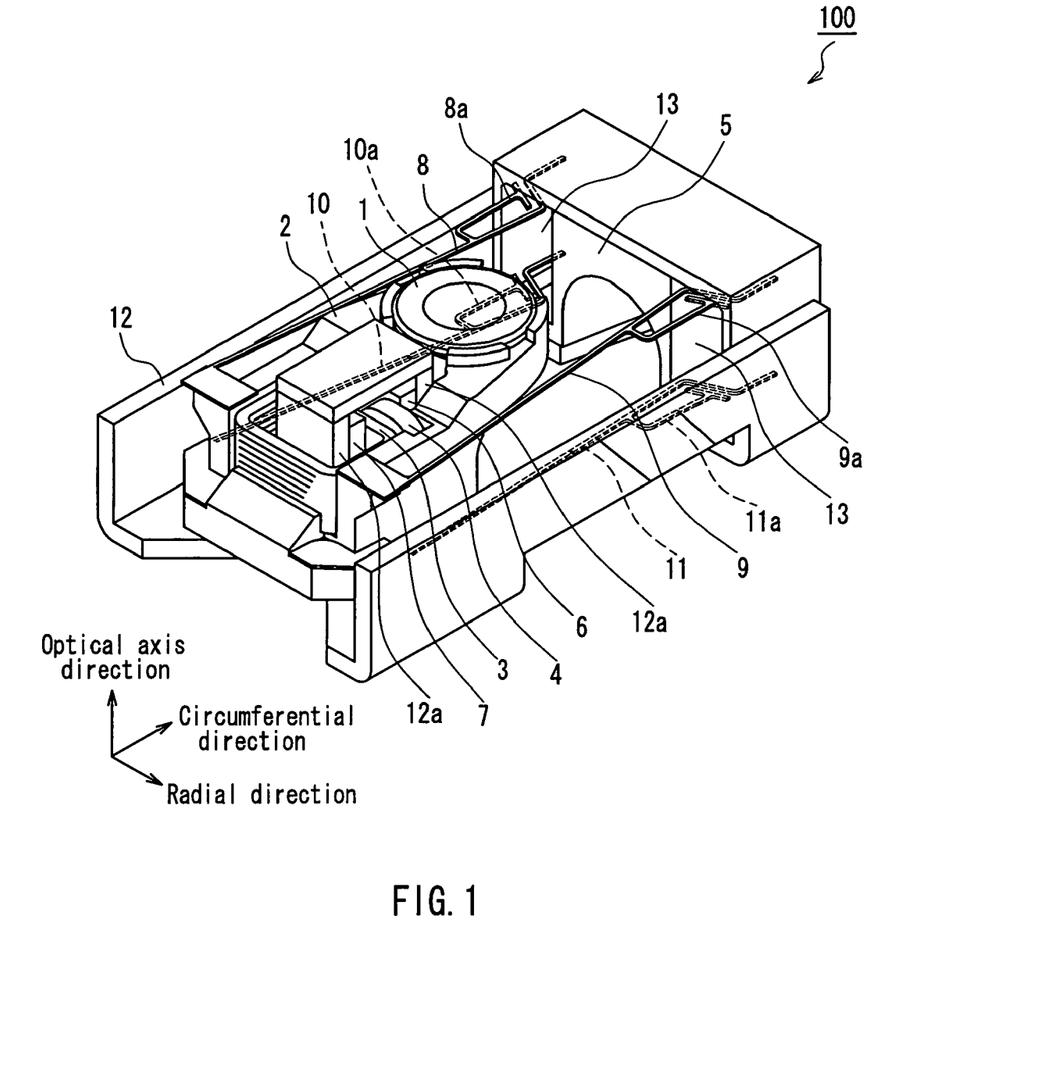
FIG. 1 is a perspective view showing a configuration of an objective lens driving device according to an embodiment.
Figure 2:
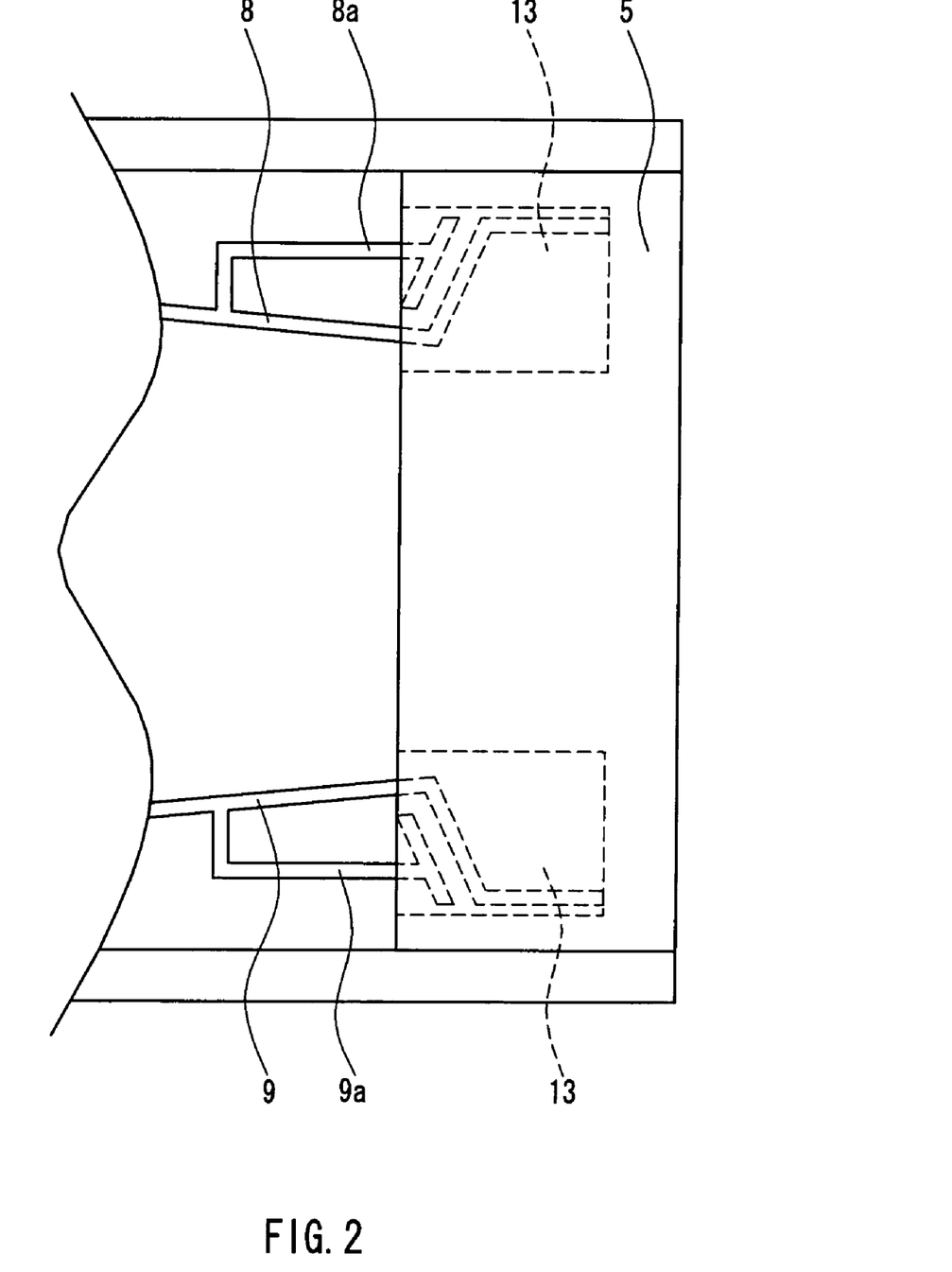
FIG. 2 is a plan view showing a configuration of support members and viscoelastic members provided in the objective lens driving device according to the embodiment.

FIG. 1 is a perspective view showing a configuration of an objective lens driving device 100 according to the present embodiment, and FIG. 2 is a plan view showing a configuration of support members 8 and 9 and viscoelastic members 13 provided in the objective lens driving device 100.

Referring to FIG. 1, the objective lens driving device 100 includes a lens holder 2, to which an objective lens 1, a focusing coil 3 and a tracking coil 4 are fixed. These lens holder 2, the objective lens 1, the focusing coil 3 and the tracking coil 4 constitute a movable portion.

The focusing coil 3 has a winding axis along an optical axis direction shown in FIG. 1, and the tracking coil 4 has a winding axis along a circumferential direction, which is a direction perpendicular to the optical axis direction and a radial direction.

The objective lens driving device 100 is provided with four support members 8, 9, 10 and 11 made of an elastic material. One end of each of the support members 8, 9, 10 and 11 is joined to the lens holder 2, while the other end thereof is fixed to a fixing member 5. Since the lens holder 2 is cantilevered by the support members 8, 9, 10 and 11 as described above, it is freely movable within the elastic deformation range of the support members 8, 9, 10 and 11.

Magnets 6 and 7 are fixed to yoke portions 12*a* provided in a base 12. The fixing member 5, the base 12, the magnets 6 and 7 constitute a fixing portion. The magnets 6 and 7 are disposed so that their opposite poles face each other, and the focusing coil 3 and the tracking coil 4 are disposed in a gap between the magnets 6 and 7 and constitute a focusing driving system and a tracking driving system, respectively.

The fixing member 5 holds the viscoelastic members 13. The vicinity of each end portion of the support members 8, 9, 10 and 11 on the side of the fixing member is covered with the viscoelastic members 13.

The above configuration is equivalent to that of the objective lens driving device 90 of the conventional example described above with reference to FIG. 9.

Referring to FIGS. 1 and 2, arm portions 8*a*, 9*a*, 10*a* and 11*a* are formed so as to branch off from and in parallel with the support members 8, 9, 10 and 11, and their tips are in contact with the viscoelastic members 13.

Now, an operation of the objective lens driving device 100 constituted as above will be described.

The operation of driving the objective lens 1 along two axes of the optical axis direction and the radial direction in order to correct the defocusing caused by the vertical motion due to the disk warping and the tracking deviation caused by decentering is equivalent to the operation described in the conventional example shown in FIG. 9. Thus, its more specific description will be omitted here.

When the above-mentioned resonance occurs in the conventional example shown in FIG. 9, the amplitude of the tip portions of the arm portions 8*a*, 9*a*, 10*a* and 11*a* that are in contact with the viscoelastic members 13 increases, since the arm portions 8*a*, 9*a*, 10*a* and 11*a* are branching off from the portion with a large amplitude in the support members 8, 9, 10 and 11.

Figure 3:
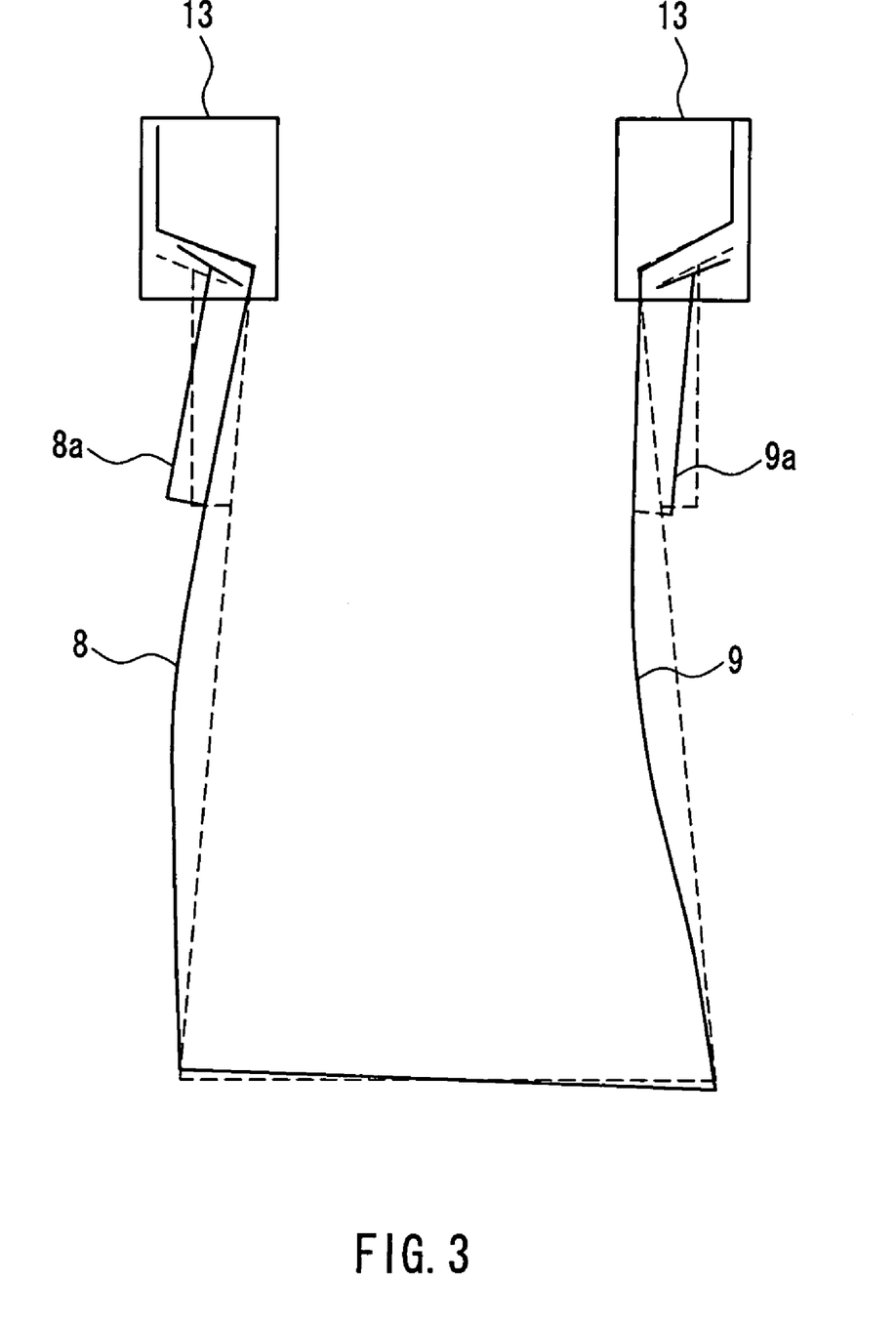
FIG. 3 is a schematic view for describing resonance of the support members provided in the objective lens driving device according to the embodiment.

FIG. 3 shows how the support members 8 and 9 and the arm portions 8*a* and 9*a* are displaced at this time in an enlarged view. The amplitude of the portion in contact with the viscoelastic members 13 becomes larger than that in the conventional configuration, so that the resonance can be reduced further compared with the conventional configuration by the vibration damping function of the viscoelastic members 13.

Figure 4:
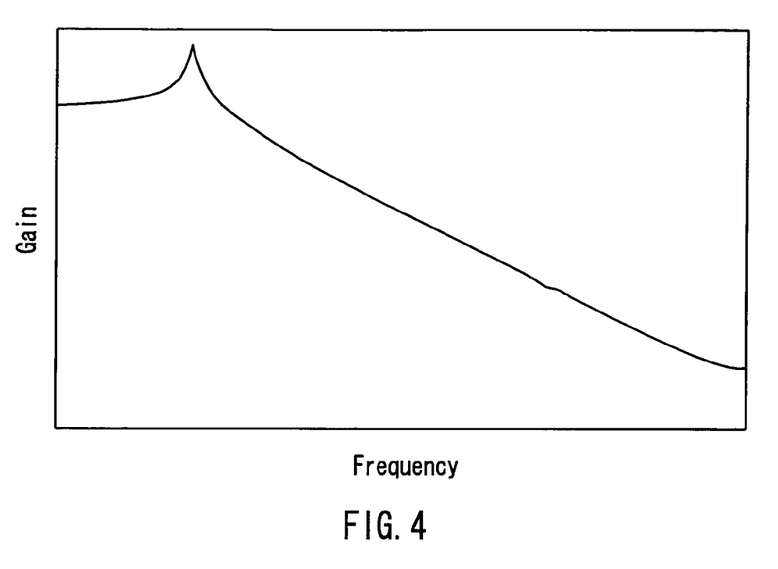
FIG. 4 is a graph showing a relationship between a resonance frequency and a gain of the support members provided in the objective lens driving device according to the embodiment.

FIG. 4 shows the displacement frequency characteristics along the radial direction (tracking direction) at this time. There is substantially no undesired resonance such as that seen in the above-mentioned frequency characteristics shown in FIG. 10 in the conventional example. Accordingly, it is possible to maintain the stability of the control for driving the objective lens 1.

As described above, in accordance with the present embodiment, each of the support members 8, 9, 10 and 11 includes a linear portion formed linearly so as to connect with the viscoelastic member 13 provided in the fixing member 5 and the lens holder 2, and the respective arm portion 8*a*, 9*a*, 10*a* or 11*a* branching off from the intermediate area of the linear portion so as to reduce the resonance of the support members 8, 9, 10 and 11 occurring when the lens holder 2 is driven by the focusing driving system and the tracking driving system. Thus, the resonance of the support members 8, 9, 10 and 11 occurring when the lens holder 2 is driven by the focusing driving system and the tracking driving system is reduced by the arm portions 8*a*, 9*a*, 10*a* and 11*a*. Consequently, with a configuration that is substantially the same as the conventional configuration, it is possible to achieve the stability for focusing driving and tracking driving.

The present embodiment has illustrated the example in which the arm portions 8*a*, 9*a*, 10*a* and 11*a* branching off from the support members 8, 9, 10 and 11 are formed in a plane perpendicular to the optical axis direction, thus reducing the undesired resonance caused in the driving along the tracking direction. However, the present invention is not limited to this. If the arm portions 8*a*, 9*a*, 10*a* and 11*a* are formed in a plane perpendicular to the radial direction, it is possible to achieve an effect of reducing the undesired resonance along the focusing direction.

Also, the present embodiment has been directed to the configuration in which one arm portion branches off from one support member. However, another configuration in which a plurality of arm portions branch off from one support member in such a manner as to extend in the plane perpendicular to the optical axis direction and the plane perpendicular to the radial direction makes it possible to achieve an effect of reducing the undesired resonance in two directions, namely, the focusing direction and the tracking direction.

Figure 5:
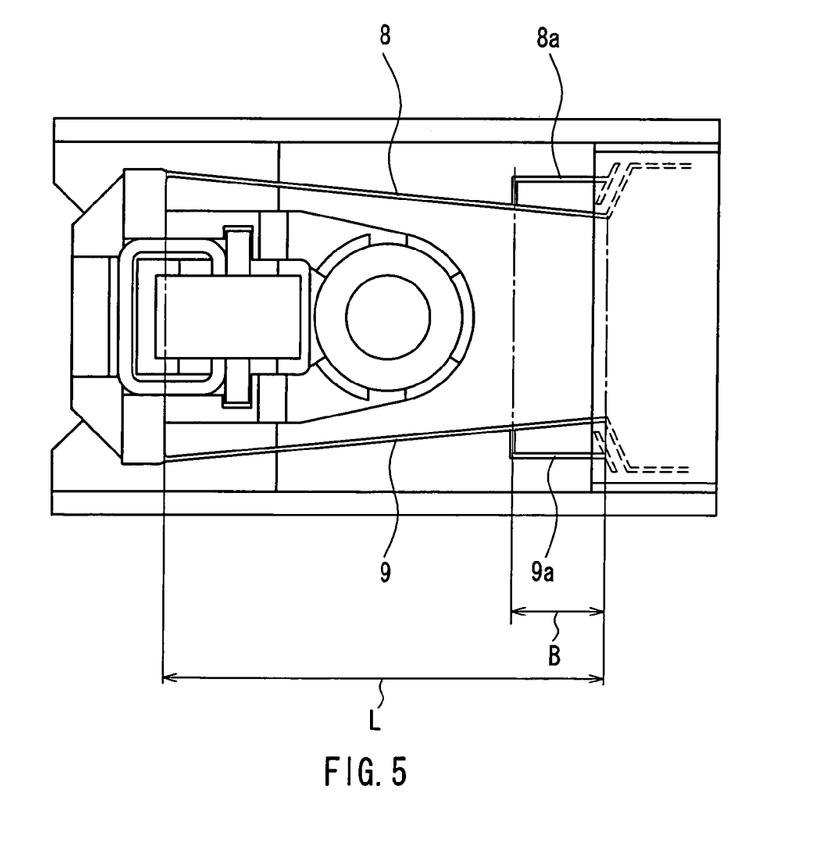
FIG. 5 is a plan view showing a configuration of an objective lens driving device according to the embodiment.

Furthermore, in the present embodiment, it is preferable that a dimension B to the position at which the arm portion branches off is ⅕ to ⅘ of a dimension L of the linear portion of the support members 8 and 9 as shown in FIG. 5. The dimension B smaller than ⅕ of the dimension L cannot achieve a sufficient effect of reducing the undesired resonance. If the dimension B is larger than ⅘ of the dimension L, the undesired resonance occurs in the branched arm portions 8*a*, 9*a*, 10*a* and 11*a*.

Considering the undesired resonance occurring in the branched arm portions 8*a*, 9*a*, 10*a* and 11*a*, it is more preferable that the dimension B is ⅕ to ½ of the dimension L.

Figure 6:
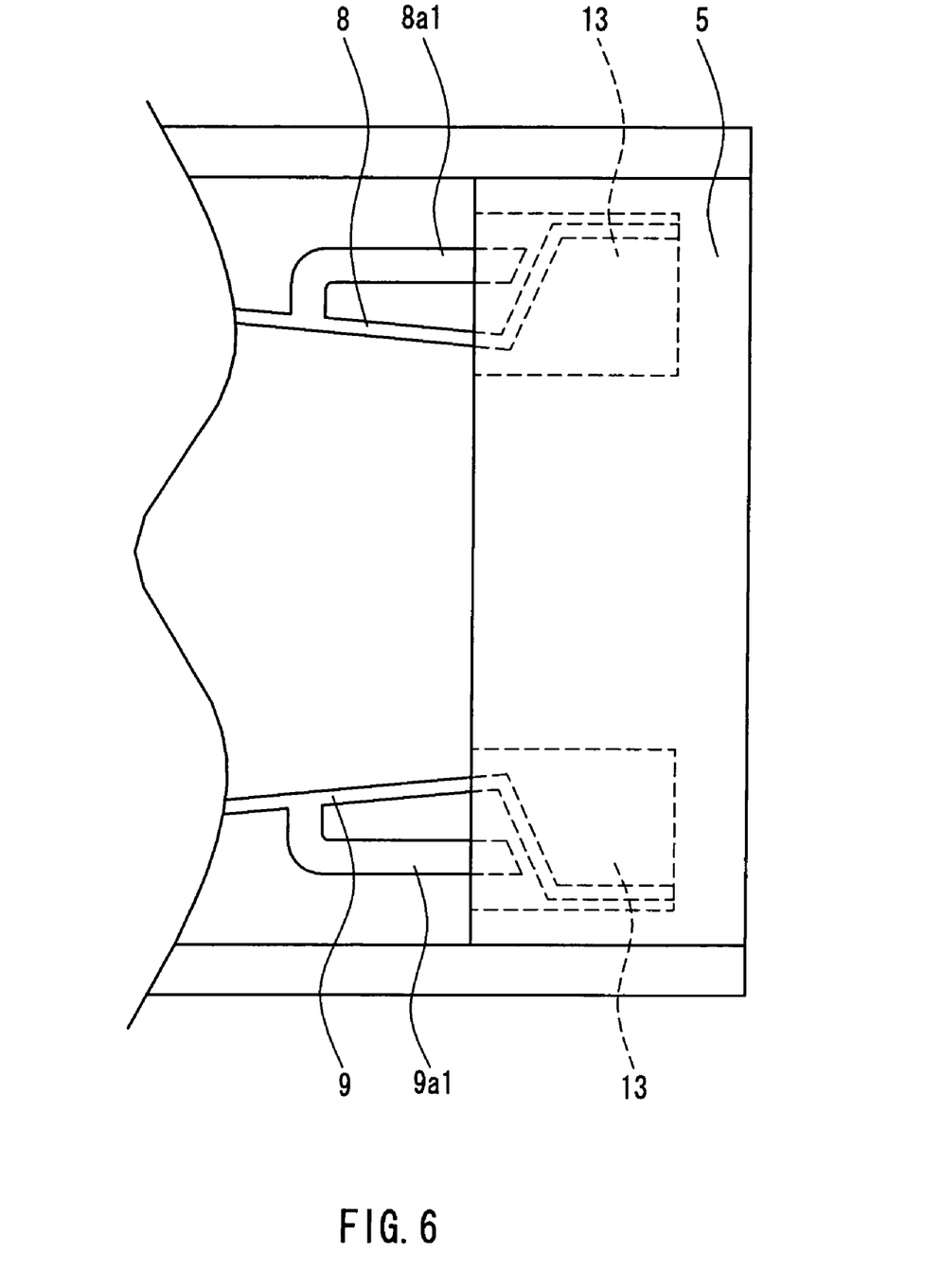
FIG. 6 is a plan view showing a configuration of support members and viscoelastic members provided in another objective lens driving device according to the embodiment.

Moreover, the present embodiment has illustrated the example in which, as shown in FIG. 2, the arm portions 8*a*, 9*a*, 10*a* and 11*a* branching off from the support members 8, 9, 10 and 11 are substantially as wide as the linear portions of the support members 8, 9, 10 and 11 and the tips of the arm portions 8*a*, 9*a*, 10*a* and 11*a* have a T shape. However, even when arm portions 8*a*1 and 9*a*1 are formed to be wider than the linear portions as shown in FIG. 6, a similar effect also can be achieved.

Figure 7:
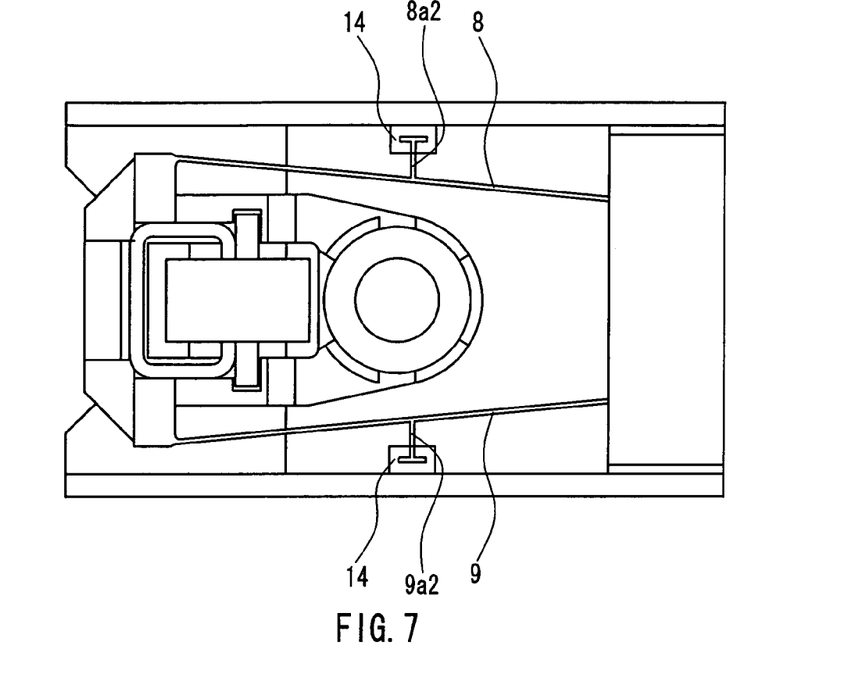
FIG. 7 is a plan view showing a configuration of a yet another objective lens driving device according to the embodiment.

Further, the present embodiment has illustrated the exemplary configuration in which the tips of the arm portions branching off from the support members 8, 9, 10 and 11 are in contact with the visoelastic members 13 that are held by the fixing member 5 and cover the end portions of the support members. However, with the configuration in which tips of the arm portions 8*a*2 and 9*a*2 are brought into contact with second visoelastic members 14 held by the base as shown in FIG. 7, it also is possible to achieve a similar effect.

Figure 8:
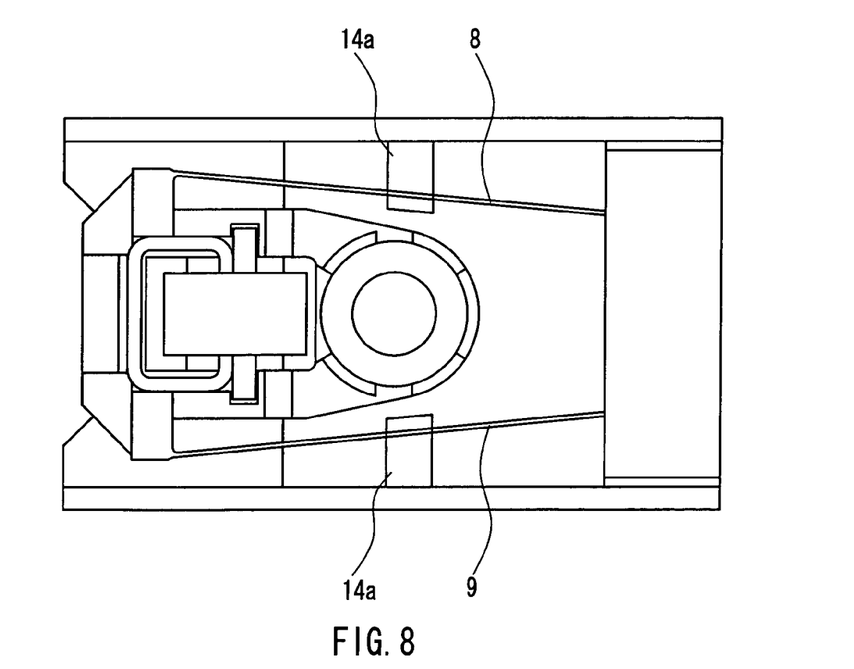
FIG. 8 is a plan view showing a configuration of a yet another objective lens driving device according to the embodiment.

In addition, although the present embodiment has illustrated the exemplary configuration in which the tips of the arm portions branching off from the support members 8, 9, 10 and 11 are in contact with the viscoelastic members 13, it also is possible to achieve a similar effect with the configuration in which the vicinities of the loops of the natural resonance of the support members 8 and 9 are in contact with second viscoelastic members 14*a* held by the base as shown in FIG. 8.

INDUSTRIAL APPLICABILITY

As described above, in accordance with the present invention, it is possible to provide an objective lens driving device that can reduce the resonance of support members, thus driving an objective lens in a stable manner.

What is claimed is:

1. An objective lens driving device comprising:
    an objective lens provided for focusing light onto a recording medium so as to optically record information on or reproduce the information from the recording medium;
    a lens holder for holding the objective lens;
    a plurality of support members for supporting the lens holder so that the objective lens is freely movable in a focusing direction perpendicular to a surface of the recording medium and a tracking direction perpendicular to the focusing direction;
    a driving system for driving the lens holder in the focusing direction and the tracking direction; and
    a fixing member provided with a viscoelastic member formed for holding the plurality of support members;
    wherein each of the plurality of support members comprises
        a linear portion formed linearly so as to connect with the viscoelastic member provided in the fixing member and the lens holder, and
        at least one arm portion branching off from an intermediate area of the linear portion so as to reduce a resonance of each of the plurality of support members occurring when the lens holder is driven by the driving system,
    the linear portion is formed as a straight line between the lens holder and the viscoelastic member,
    the arm portion branches off from a part of the straight line of the linear portion,
    the arm portion has a T-shaped tip held by the viscoelastic member, and
    the linear portion has a bent portion formed in its end portion held by the viscoelastic member.

2. The objective lens driving device according to claim 1, further comprising a base for fixing the fixing member,
    wherein the arm portion is formed to connect with a base viscoelastic member provided in the base.

3. The objective lens driving device according to claim 1, wherein the arm portion is formed in a plane perpendicular to the focusing direction.

4. The objective lens driving device according to claim 1, wherein the arm portion is formed in a plane perpendicular to the tracking direction.

5. The objective lens driving device according to claim 1, wherein the at least one arm portion comprises two arm portions,
    one of the two arm portions is formed in a plane perpendicular to the focusing direction, and
    the other is formed in a plane perpendicular to the tracking direction.

6. The objective lens driving device according to claim 1, wherein the arm portion is formed to branch off from a vicinity of a loop of a natural resonance of the support members.

7. The objective lens driving device according to claim 1, wherein a distance B between a position at which the arm portion branches off from the linear portion and one end of the linear portion is $\frac{1}{5}$ to $\frac{4}{5}$ of a total length L of the linear portion.

8. The objective lens driving device according to claim 1, wherein a distance B between a position at which the arm portion branches off from the linear portion and one end of the linear portion is $\frac{1}{5}$ to $\frac{1}{2}$ of a total length L of the linear portion.

* * * * *